US010118226B2

(12) United States Patent
Baudimont

(10) Patent No.: US 10,118,226 B2
(45) Date of Patent: Nov. 6, 2018

(54) METHOD FOR MANUFACTURING AN ASYMMETRIC COMPONENT USING ADDITIVE MANUFACTURING

(71) Applicant: SAFRAN AIRCRAFT ENGINES, Paris (FR)

(72) Inventor: Cyrille Baudimont, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 232 days.

(21) Appl. No.: 14/783,584

(22) PCT Filed: Apr. 1, 2014

(86) PCT No.: PCT/FR2014/050779
§ 371 (c)(1),
(2) Date: Oct. 9, 2015

(87) PCT Pub. No.: WO2014/167212
PCT Pub. Date: Oct. 16, 2014

(65) Prior Publication Data
US 2016/0059315 A1   Mar. 3, 2016

(30) Foreign Application Priority Data
Apr. 10, 2013   (FR) .................................... 13 53217

(51) Int. Cl.
*B22F 3/24*   (2006.01)
*B22F 3/105*   (2006.01)
(Continued)

(52) U.S. Cl.
CPC .............. *B22F 3/24* (2013.01); *B22F 3/1055* (2013.01); *B23K 26/342* (2015.10);
(Continued)

(58) Field of Classification Search
CPC .................................. B33Y 10/00; B22F 3/24
See application file for complete search history.

(56) References Cited

U.S. PATENT DOCUMENTS

| | | |
|---|---|---|
| 5,216,616 A | 6/1993 | Masters |
| 2003/0004600 A1 | 1/2003 | Priedeman, Jr. |

(Continued)

FOREIGN PATENT DOCUMENTS

| | | |
|---|---|---|
| WO | 2012 001324 | 1/2012 |
| WO | 2012 103603 | 8/2012 |

OTHER PUBLICATIONS

International Search Report dated Sep. 25, 2014, in PCT/FR2014/050779 filed Apr. 1, 2014.

*Primary Examiner* — Weiping Zhu
(74) *Attorney, Agent, or Firm* — Oblon, McClelland, Maier & Neustadt, L.L.P.

(57) ABSTRACT

A method of fabricating a part by additive fabrication, in particular by melting or sintering particles of powder by means of a high energy beam. The method includes supplying a digital model of a part to be fabricated; orienting the model relative to a construction direction for constructing the part; modifying the model by adding a sacrificial balancing fraction configured so as to balance the residual stresses that appear in the part while it is being fabricated; making a rough part layer by layer using an additive fabrication technique on the basis of the model as modified in this way, the layers being stacked in the construction direction; and using a material-removal method to eliminate the sacrificial portion from the rough part as results from the sacrificial balancing fraction of the model, thereby obtaining the part that is to be fabricated.

12 Claims, 3 Drawing Sheets

(51) Int. Cl.
*B23K 26/342* (2014.01)
*B29C 64/153* (2017.01)
*B29C 64/40* (2017.01)
B22F 5/04 (2006.01)
B33Y 10/00 (2015.01)
B33Y 40/00 (2015.01)

(52) U.S. Cl.
CPC ............ *B29C 64/153* (2017.08); *B29C 64/40* (2017.08); *B22F 5/04* (2013.01); *B22F 2003/1057* (2013.01); *B22F 2003/1058* (2013.01); *B22F 2003/247* (2013.01); *B33Y 10/00* (2014.12); *B33Y 40/00* (2014.12); *Y02P 10/295* (2015.11)

(56) References Cited

U.S. PATENT DOCUMENTS

2008/0071030 A1    3/2008  Priedeman, Jr.
2013/0112366 A1    5/2013  Mottin et al.
2013/0312928 A1*  11/2013  Mercelis ............... B22F 3/1055
                                                              164/492

* cited by examiner

METHOD FOR MANUFACTURING AN ASYMMETRIC COMPONENT USING ADDITIVE MANUFACTURING

FIELD OF THE INVENTION

The present description relates to a method of fabricating a part by additive fabrication, in particular by melting or sintering particles of powder by means of a high energy beam.

The method is particularly suitable for fabricating parts that present asymmetry or large mass disparities, in particular for the field of aviation.

STATE OF THE PRIOR ART

It is already known, in particular in the field of aviation, to use additive fabrication methods in order to make certain parts of shapes that are fine or complex.

A conventional example of additive fabrication is fabrication by melting or sintering powder particles by means of a high energy beam. Among such high energy beams, mention may be made in particular of laser beams and of electron beams.

The term "selective laser melting" (SLM) is used to designate a method having the main characteristics as set out below with reference to FIG. 1, which shows a conventional device for fabricating a part by selective melting or sintering of beds of powder by means of a laser beam.

A first layer 10a of powder of a material is deposited, e.g. with the help of a roller 20 (or any other deposition means) on a fabrication plate 21 (which may be a single plate or which may be surmounted by a solid support, or by a portion of another part, or by a support grid used to facilitate constructing certain parts).

The powder is transferred from a feed bin 22 during go and return movement of the roller 20 and it is then scraped and possibly also compacted a little during one or more return movements of the roller 20. The powder is made up of particles 11. Excess powder is recovered in a recycling bin 23 situated adjacent to the construction bin 24 in which the fabrication plate 21 moves vertically.

Use is also made of a generator 30 for generating a laser beam 31 and of a control system 32 for directing the beam 31 onto any region of the fabrication plate 21 so as to scan any region of a previously deposited layer of powder. The laser beam 31 is shaped and its diameter in the focal plane is varied respectively by means of a beam expander 33 and by means of a focusing system 34, which together constitute the optical system.

Thereafter, a region of the first layer 10a of powder is raised to a temperature higher than the melting temperature of the powder by being scanned with a laser beam 31.

The SLM method may use any high energy beam instead of the laser beam 31, and in particular it may use an electron beam, providing the beam has sufficient energy to melt the particles of powder and a portion of the material on which the particles rest.

By way of example, the beam may be caused to scan by a galvanometer head that forms part of a control system 32. For example, the control system includes at least one steerable mirror 35 on which the laser beam 31 is reflected before reaching a layer of powder where each point of the surface is always situated at the same height relative to the focusing lens contained in the focusing system 34, with the angular position of the mirror being controlled by a galvanometer head so that the laser beam scans at least a region of the first layer of powder, and thus follows a pre-established profile for a part. For this purpose, the galvanometer head is controlled using information contained in the database of the computer tool used for the computer assisted design and fabrication of the part that is to be fabricated.

Thus, the particles of powder 11 in this region of the first layer 10a are melted and they form a first single-piece element 12a that is secured to the fabrication plate 21. At this stage, it is also possible to use the laser beam to scan a plurality of independent regions of the first layer so as to form a plurality of mutually disjoint first elements 12a once the material has been melted and has solidified.

The fabrication plate 21 is lowered through a height corresponding to the thickness of the first layer of powder 10a (through 20 micrometers (μm) to 100 μm, and generally through 30 μm to 50 μm).

Thereafter, a second layer 10b of powder is deposited on the first layer 10a and on the first single-piece or consolidated element 12a, and the second layer 10b as situated in part or completely over the first single-piece or consolidated element 12a as shown in FIG. 1 is heated by being exposed to the laser beam 31 in such a manner that the powder particles in this region of the second layer 10b are melted together with at least a portion of the element 12a so as to form a second single-piece or consolidated element 12b, with these two elements 12a and 12b together forming a single-piece block in the example shown in FIG. 1.

Such an additive fabrication technique, or other techniques such as fabrication by powder projection, thus provides excellent control over the shape of the part that is to be fabricated and enables parts to be made that are very fine.

Nevertheless, those techniques require carefully thought-out construction strategies that are specific to the part that is to be fabricated in order to comply with its dimensional tolerances and in order to ensure it has good mechanical strength. It is thus necessary to use computer assisted design (CAD) software in order to define the best position and the best orientation for the part for the purpose of fabricating it layer by layer. Although fabrication strategies are still developing and being refined, they are not at present satisfactory for obtaining parts that are asymmetrical or that present large mass disparities.

When making such parts by additive fabrication, it is frequently observed that there are irreversible metallurgical defects, e.g. the appearance of cracks, and/or dimensional defects, with certain portions of the part not complying with the specified tolerances. Mass disparities, as a result in particular from asymmetries of the part, lead to residual stresses accumulating in certain zones of the part, which residual stresses then lead to deformations: these poorly balanced residual stresses thus give rise to geometrical dispersions that are responsible for the defects observed in the resulting parts. Unfortunately, such defects are often unacceptable and lead to the resulting part being scrapped, thereby giving rise to considerable losses and thus high overall fabrication costs.

There therefore exists a real need for a method of fabricating a part by additive fabrication that is adapted to such parts that are asymmetrical or that present large mass disparities.

SUMMARY OF THE INVENTION

The present description relates to a method of fabricating a part by additive fabrication, the method comprising the following steps: supplying a digital model of a part to be fabricated; orienting the model relative to a construction direction for constructing the part; modifying the model by adding a sacrificial balancing fraction configured so as to balance the residual stresses that appear in the part while it is being fabricated; making a rough part layer by layer using an additive fabrication technique on the basis of the model as modified in this way, said layers being stacked in the construction direction; and using a material-removal method to eliminate the sacrificial portion from the rough part as results from the sacrificial balancing fraction of the model, thereby obtaining said part that is to be fabricated.

By means of this method, it is possible during the stage of computer assisted design to detect a potential risk of residual stresses accumulating during fabrication as a result in particular of asymmetries within the part, or at least of large mass disparities, and then to correct the model of the part artificially so as to give it an overall shape that is more regular and better proportioned so as to enable residual stresses within the part to be balanced during fabrication.

Thus, during layer-by-layer fabrication, residual stresses become distributed within the part in more uniform manner: this avoids these residual stresses becoming concentrated in certain regions of the part to above a certain threshold likely to lead to critical deformations of the part. For example, adding such a sacrificial fraction can make it possible to reduce certain edge effects or to shift a region of stress concentration towards a portion of the part that is less sensitive to deformation, e.g. a portion that is thicker or that possesses a shape that is particularly simple, or towards a portion of the part in which mechanical or dimensional tolerances are greater.

Under such circumstances, the rough part that is obtained presents fewer defects, both dimensionally and mechanically: it then suffices to use a conventional material-removal method to remove the sacrificial balancing portion from the rough part that results from the sacrificial balancing fraction of the model, thereby obtaining the desired part.

By means of this method, it is thus possible to use additive fabrication for obtaining a part that is asymmetrical or that presents great disparity, while benefiting from all of the advantages of additive fabrication, and while nevertheless presenting few or no defects.

In certain implementations, the part to be fabricated possesses an asymmetrical portion, and the sacrificial balancing fraction is configured in such a manner that the sacrificial portion of the rough part possesses mass lying in the range 70% to 130% of the mass of the asymmetrical portion, preferably in the range 90% to 110%.

The term "asymmetrical portion" is used to mean a portion that, if it were to be removed from the part, would leave a residual part possessing at least one more element of symmetry than the original part. This definition can be transposed directly to the model.

The term "element of symmetry" is used to mean symmetry relative to a given plane, symmetry relative to a given point, invariance relative to a given rotation, or indeed any other invariance as a result of a given geometrical relationship.

Throughout this description, the concept of symmetry should be understood with a certain amount of tolerance: thus, an element or a pair of elements is said to be symmetrical providing at least 90% of the element or of the pair is indeed symmetrical in the strict geometrical sense; minor local differences, if any, are thus not taken into consideration. This definition extends to the planes of symmetry and more widely to all elements of symmetry.

By means of this sacrificial portion that possesses mass relatively close to the mass of the asymmetrical portion, it is possible to correct, at least in part, the mass disparity that results from the asymmetrical portion: such an approach makes it possible to obtain better balancing of residual stresses in the rough part, both easily and in substantial manner, thereby obtaining a remarkably favorable impact on the unwanted occurrence of defects in the rough part.

In certain implementations, the sacrificial balancing fraction is added over a height substantially equivalent to the height of the asymmetrical portion. Thus, the residual stresses are rebalanced for substantially all of the layers that were originally asymmetrical and that thus originally presented mass disparity.

In certain implementations, the sacrificial balancing fraction extends the model in its longest direction.

In certain implementations, the sacrificial balancing fraction is configured in such a manner that the resulting sacrificial portion is constructed opposite from the asymmetrical portion relative to the rough part. In this way, the distribution of mass within the rough part is rebalanced, thereby rebalancing the residual stresses that are caused to appear during fabrication, with these stresses being shifted in part towards the center of the part.

In certain implementations, the sacrificial balancing fraction is added so as to provide the model with at least one additional element of symmetry, preferably an additional plane of symmetry. The distribution of residual stresses is thus better distributed since it too benefits from an additional element of symmetry. Artificially restoring symmetry in this way in the meaning of the description thus makes it possible in striking manner to reduce the occurrence and the magnitude of defects in the rough part.

In certain implementations, the sacrificial balancing fraction is located in such a manner that the resulting sacrificial portion is situated in a region that is symmetrical to the region of the asymmetrical portion relative to a plane passing through the center of gravity of the rough part.

In certain implementations, the sacrificial balancing fraction is configured so that the sacrificial portion of the rough part is symmetrical to the asymmetrical portion relative to a plane, this plane being a plane of symmetry of the rough part. Such a plane of symmetry is particularly easy to put into place with the help of the CAD software while working on the model of the part.

In certain implementations, the step of modifying the model includes a step of defining an equilibrium plane parallel to the construction direction and corresponding to a plane of symmetry that the model would have if it did not have its asymmetrical portion corresponding to the asymmetrical portion of the part. This step makes it easy to identify a candidate plane of symmetry for the rough part.

In certain implementations, the step of modifying the model includes a balancing step during which a balancing segment is added to the model in each layer perpendicular to the construction direction, the balancing segment restoring symmetry to the layer under consideration of the model relative to the equilibrium plane. In this way, it is possible to ensure that masses on either side of the equilibrium plane are uniform layer by layer along the construction direction: each layer that is made by additive fabrication thus has a symmetrical distribution of mass, thereby minimizing deformation.

In certain implementations, said additive fabrication technique is a method of fabrication by selective melting or selective sintering of beds of powder.

In certain implementations, said method of fabrication by selective melting or selective sintering of beds of powder makes use of a laser beam.

In other implementations, said method of fabrication by selective melting or selective sintering of beds of powder uses an electron beam.

In other modes of implementation, said additive fabrication technique is a method of fabrication by powder projection.

In certain implementations, during the orientation step, the model is oriented in such a manner as to minimize the number of fabrication supports and/or to minimize their sizes. Such fabrication supports are necessary in particular when a layer of the part projects laterally from the support formed by the immediately underlying layer of the part. In this way, it is possible to limit the number of machining operations that need to be performed on the rough part in order to obtain the part: this also serves to save powder. In addition, this serves to limit the impact of the roughness that results from the method of using layers.

In certain implementations, during the orientation step, the model is oriented in such a manner as to minimize the height of the part in the construction direction. This serves to minimize the number of layers and thus the quantity of powder used and also the time required for fabrication. In addition, any risk of deformation is also reduced and the resulting surface state is more uniform.

In certain implementations, the part to be fabricated is a blading part having a leading edge, a trailing edge, and an airfoil.

In certain implementations, the digital model of the blading part is oriented in such a manner that its leading edge or its trailing edge faces towards the construction table. In this way, it is possible to minimize recourse to fabrication supports.

In certain implementations, the equilibrium plane of the blading part intersects the blading part substantially halfway along its airfoil.

The above-mentioned characteristics and advantages, and others, appear on reading the following detailed description of implementations of the proposed method. This detailed description refers to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of elements) that are identical are identified by the same reference signs.

DETAILED DESCRIPTION OF IMPLEMENTATION(S)

In order to make the invention more concrete, an example method is described in detail below with reference to the accompanying drawings. It should be recalled that the invention is not limited to this example.

Figure 6:
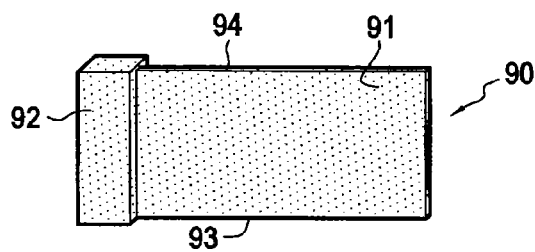
FIG. 6 is a perspective view of the final part after removing the sacrificial portion from the rough part.

In the context of this example, the objective is to fabricate a blade 90 as shown very diagrammatically in FIG. 6. The blade 90 comprises an airfoil 91 having a leading edge 93 and a trailing edge 94, together with a root 92 that is provided at one end of the airfoil 91. The airfoil 91 is fine and elongate while the root 92 is thick and compact: the root 92 thus constitutes an asymmetrical portion of the blade 90. If the blade 90 did not have its root 92, then it would have a plane of symmetry intersecting the airfoil 91 halfway along.

Figure 2A:
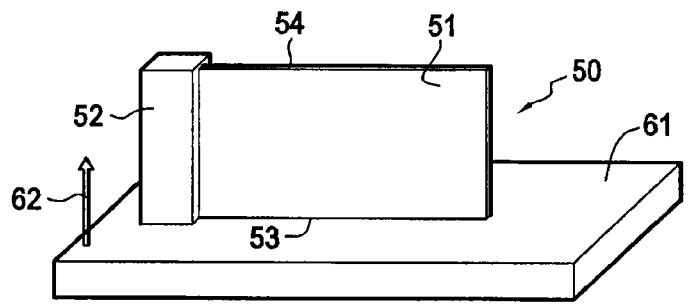
FIGS. 2A and 2B are a perspective view and a plan view of an original model for an example part for fabrication.
Figure 2B:
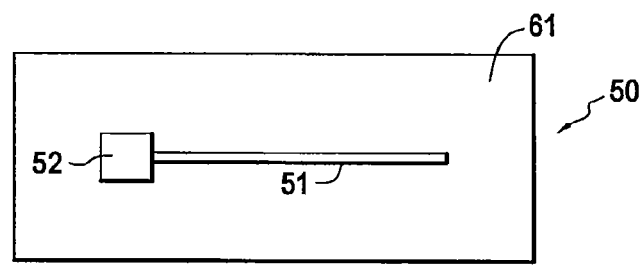

During a first step, the digital model 50 of the blade 90 is received in computer assisted design (CAD) software. As shown in FIGS. 2A and 2B, the digital model 50 has a first portion 51 that is fine and elongate, corresponding to the airfoil 91, and a second portion 52 that is thick and compact, corresponding to the root 92. Thus, the second portion 52 of the model 50 constitutes an asymmetrical portion of the model 50.

During a second step, the model 50 is oriented relative to the digital image 61 of the fabrication plate 21 and to the construction direction 62 perpendicular to said image of the plate 61. In order to minimize recourse to fabrication supports, the model 50 is oriented in such a manner that its edge 53 corresponding to the leading edge 93 of the blade 90 faces towards the image of the plate 61. Nevertheless, it is also possible to orient the model 50 that its edge 54 corresponding to the trailing edge 94 of the blade 90 is directed towards the image of the plate 61.

Figure 3A:
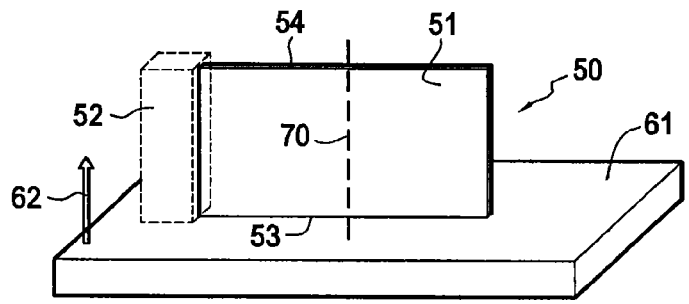
FIGS. 3A and 3B are a perspective view and a plan view of the model of FIGS. 2A and 2B for which an equilibrium plane has been defined.
Figure 3B:
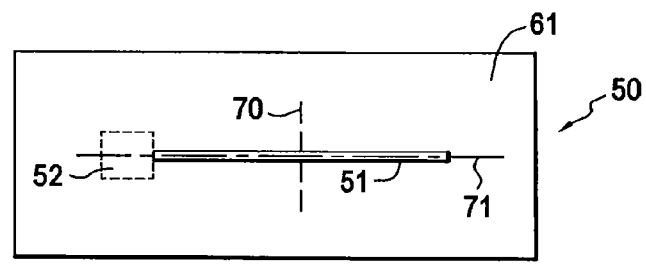

During a third step shown in FIGS. 3A and 3B, attention is given to the residual portion of the model 50 when it does not have its asymmetrical portion 52: specifically, this is the first portion 51 that corresponds to the airfoil 91. A plane of symmetry 70 for this residual portion 51 is then identified that is parallel to the construction direction 62 and it is defined as the equilibrium plane of the model 50. Specifically, the equilibrium plane 70 intersects the first portion 51 of the model 50 corresponding to the airfoil 91 of the blade 90 halfway along the airfoil in the airfoil height direction.

On this topic, it may be observed that the residual portion 51 of the model 50 presents a second plane of symmetry 71 that is longitudinal and likewise parallel to the construction direction 62: nevertheless, this other plane of symmetry 71 cannot be selected as an equilibrium plane insofar as the original model 50 of the blade 90 is already symmetrical about this plane 71.

Figure 4A:
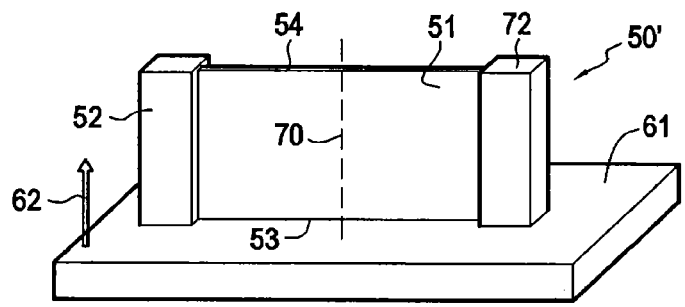
FIG. 4A is a perspective view of the model of FIGS. 3A and 3B to which a sacrificial balancing fraction has been added.
Figure 4B:
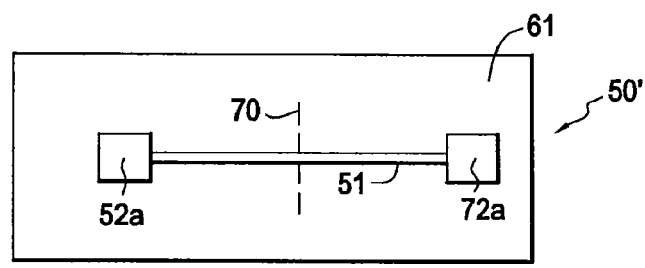
FIG. 4B is a plan view of a layer of the FIG. 4A model.

During a fourth step shown in FIG. 4B, attention is given in succession to each fabrication layer along the construction direction 62 starting from the image of the plate 61, and in each layer, a balancing segment 72a is added to the model 50 so as to restore symmetry to the layer relative to the equilibrium plane 70. Thus, in each layer perpendicular to the construction direction 62, the balancing segment 72a is symmetrical to the corresponding segment 52a of the asymmetrical portion 52.

Once this operation has been performed for all of the layers of the model 50, a modified model 50' is obtained as shown in FIG. 4A that includes a sacrificial balancing fraction 72 made up from the stack of balancing segments 72a. The modified model 50' is thus now symmetrical relative to the equilibrium plane 70, the sacrificial balancing fraction 72 being symmetrical to the asymmetrical portion 52 relative to the equilibrium plane 70.

Figure 1:
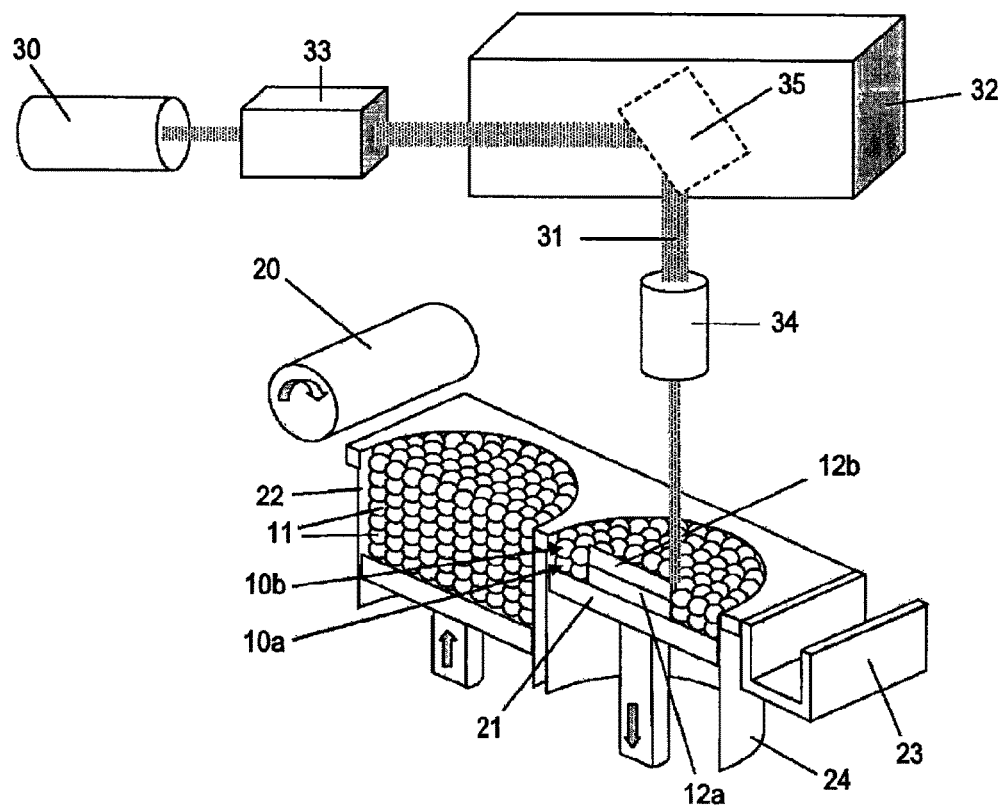
FIG. 1 is an overall view of a device for additive fabrication by selectively melting beds of powder.

Under such circumstances, it is possible to launch fabrication of the rough part 80 using layer-by-layer additive fabrication on the basis of the modified model 50'. In this example, and as shown in FIG. 1, the method is a method of fabrication by selectively sintering beds of powder. Nevertheless, it could in analogous manner be a method of fabrication by powder projection.

A first layer 10a of powder of the desired material, specifically nickel-based powder, is thus deposited on the fabrication plate 21.

A first region of said first layer 10a is scanned with the laser beam 31 so as to heat the powder of said region locally to a temperature higher than the sintering temperature of the powder, such that the particles of said powder as melted or sintered in this way and that are located in said first region then form a first single-piece element 12a.

A second layer 10b of powder of said material is deposited on said first layer of powder 10a.

A second region of said second layer 10b overlapping said first single-piece element 12a at least in part is scanned by the laser 31 so as to heat the powder in this second region to a temperature higher than the sintering temperature of the powder, so that the particles of the powder as sintered or melted in this way form a second single-piece element 12b connected to the first single-piece element 12a and overlying it.

Figure 5:
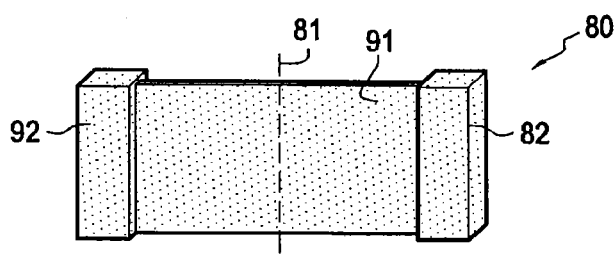
FIG. 5 is a perspective view of the rough part obtained using the model of FIG. 4A.

The two above steps are then repeated for each new layer of powder that is to be deposited over a preceding layer, and until the rough part 80 shown in FIG. 5 has been formed in full.

This rough part 80 comprises the desired airfoil 91 and root 92 together with a sacrificial balancing portion 82 that is symmetrical to the root 92 relative to the plane of symmetry 81 of the rough part 80, which plane corresponds to the equilibrium plane 70. Ideally, the sacrificial balancing portion 82 thus possesses the same shape, in reflection, and the same mass as the root 91 constituting the asymmetrical portion of the blade 90.

Because of the presence of this sacrificial balancing portion 82 that is fabricated at the same time as the remainder of the rough part 80, the configuration of the residual stresses in the rough part 80 is distributed symmetrically, and thus in balanced manner, on either side of the plane of symmetry 81. The rough part 80 thus does not have any major defects of the kind that usually results from the deformations caused by residual stresses.

Finally, once the rough part 80 has been obtained, it suffices to remove the sacrificial balancing portion 82 by machining in order to obtain the desired blade 90. In certain circumstances, additional machining steps may be needed prior to obtaining the final part, in particular when fabrication supports are necessary.

The implementations described in the present description are given by way of non-limiting illustration, and in the light of this description, a person skilled in the art can easily modify these implementations, or envisage others, while remaining within the ambit of the invention.

Furthermore, the various characteristics of these implementations can be used on their own or they can be combined with one another. When they are combined, these characteristics may be combined as described above or in other ways, the invention not being limited to the specific combinations described in the present description. In particular, unless specified to the contrary, a characteristic described with reference to any one implementation may be applied in analogous manner to any other implementation.

The invention claimed is:

1. A method of fabricating a part by additive fabrication, the part to be fabricated possessing an asymmetrical portion, the method comprising:
   supplying a digital model of a part to be fabricated;
   orienting the digital model relative to a construction direction for constructing the part;
   modifying the digital model by adding a sacrificial balancing fraction configured so as to balance residual stresses that appear in the part while fabricating the part;
   making a rough part layer by layer using an additive fabrication technique based on the modified digital model, said layers being stacked in the construction direction, the rough part including a sacrificial portion corresponding to the sacrificial balancing fraction of the modified digital model; and
   eliminating the sacrificial portion from the rough part using a material removal method to obtain said part that is to be fabricated;
   wherein the sacrificial balancing fraction is configured in such a manner that the sacrificial portion of the rough part possesses mass lying in a range 70% to 130% of a mass of the asymmetrical portion.

2. A method according to claim 1, wherein the sacrificial balancing fraction is configured so that the sacrificial portion of the rough part possesses mass lies in a range 90% to 110% of the mass of the asymmetrical portion.

3. A method according to claim 2, wherein the sacrificial balancing fraction is added over a height substantially equivalent to a height of the asymmetrical portion.

4. A method according to claim 2, wherein the sacrificial balancing fraction is configured in such a manner that the resulting sacrificial portion is constructed opposite from the asymmetrical portion relative to the rough part.

5. A method according to claim 2, wherein the sacrificial balancing fraction is added so as to provide the model with at least one additional element of symmetry.

6. A method according to claim 2, wherein the sacrificial balancing fraction is configured in such a manner that the sacrificial portion of the rough part is symmetrical to the asymmetrical portion relative to a plane, said plane being a plane of symmetry of the rough part.

7. A method according to claim 2, wherein the modifying the digital model includes a step of defining an equilibrium plane parallel to the construction direction and corresponding to a plane of symmetry that the digital model would have if the digital model did not have its asymmetrical portion corresponding to the asymmetrical portion of the part.

8. A method according to claim 7, wherein the modifying the digital model includes adding a balancing segment to the digital model in each layer perpendicular to the construction direction, the balancing segment restoring symmetry to the layer under consideration of the digital model relative to the equilibrium plane.

9. A method according to claim 7, wherein the part to be fabricated is a blading part having a leading edge, a trailing edge, and an airfoil;
   the digital model of the blading part is oriented in such a manner that its leading edge or its trailing edge faces towards the construction table; and
   the equilibrium plane of the blading part intersects the blading part substantially halfway along the airfoil.

10. A method according to claim 1, wherein said additive fabrication technique is a method of fabrication by selecting melting or selecting sintering of beds of powder, or a method of fabrication by powder projection.

11. A method according to claim 1, wherein during the orienting, the model is oriented so as to minimize at least one of a number of fabrication supports and sizes of the fabrication supports.

12. A method according to claim 1, wherein the part to be fabricated is a blade comprising an airfoil and a root provided at an end of the airfoil, the airfoil including a leading edge and a trailing edge, and wherein the root of the blade is the asymmetric portion.

* * * * *